United States Patent [19]

Otsuka et al.

[11] 4,325,426
[45] Apr. 20, 1982

[54] AIR CONDITIONER SYSTEM

[75] Inventors: Fumio Otsuka, Kariya; Teiichi Nabeta, Okazaki; Yasufumi Kojima, Gifu; Takeo Matsushima; Yasuhiro Fujioka, both of Toyota; Eiichi Wada, Okazaki, all of Japan

[73] Assignees: Nippondenso Co., Ltd., Kariya; Toyota Jidosha Kogyo Kabushiki Kaisha, Toyota, both of Japan

[21] Appl. No.: 156,797

[22] Filed: Jun. 5, 1980

[30] Foreign Application Priority Data

Jun. 12, 1979 [JP] Japan .................................. 54/74420

[51] Int. Cl.³ ....................... F25B 13/00; G05D 15/00
[52] U.S. Cl. ......................................... 165/2; 165/12; 165/26; 165/30; 165/43; 62/158; 236/78 D; 237/12.3 B
[58] Field of Search ................... 165/2, 12, 26, 27, 30, 165/42, 43; 237/12.3 B; 62/158, 243, 244; 318/471, 473; 236/78 D

[56] References Cited

U.S. PATENT DOCUMENTS 4,147,205 4/1979 Bata et al. ............................. 165/26
4,274,265 6/1981 Okumura ............................. 62/158

FOREIGN PATENT DOCUMENTS 55-56552 4/1980 Japan .................................. 237/8 A Primary Examiner—Albert W. Davis
Assistant Examiner—Margaret A. Focarino
Attorney, Agent, or Firm—Cushman, Darby & Cushman

[57] ABSTRACT

An air conditioner system for sensing and controlling the temperature in the compartment of an automotive vehicle to an established desired temperature includes an over-correction means whereby the vehicle compartment temperature is temporarily increased to exceed the desired temperature and the temperature rise is terminated after the sensed temperature has attained or nearly attained the desired temperature. When the sensed temperature rises so that the difference between it and the desired temperature exceeds a reference value, the corresponding correction signal is generated and correction is applied repeatedly so as to make the difference less than the reference value and thereby to attain the desired compartment temperature.

5 Claims, 5 Drawing Figures

AIR CONDITIONER SYSTEM

BACKGROUND OF THE INVENTION

The present invention relates to air conditioner systems for automotive vehicles and more particularly to an improved air conditioner system which is capable of rapidly providing the desired cooling or heating effect in such cases as during the starting period of air conditioning where the actual temperature deviates considerably from the desired temperature.

In the past, the conventional air conditioner systems for automotive vehicles have been designed so that the amount of heat radiated into an air-conditioned area is controlled in accordance with the overall controlling conditions including the sensed actual temperature value and the desired temperature value of the air-conditioned area so as to cause the actual temperature to approach the desired value. In accordance with this control method, as the detected value approaches the desired value, the amount of adjustment is decreased and consequently the rate of change of the actual temperature is decreased gradually. As a result, when it is desired to obtain a rapid cooling or heating effect, the amount of air (air flow) blown into the air-conditioned area through the heat exchangers must be temporarily decreased so as to greatly decrease or increase the temperature around the heat exchangers and then the amount of air flow must be increased so as to rapidly increase the amount of heat radiated. However, this control method is disadvantageous in that the amount of the heat stored in the vicinity of the heat exchangers cannot be grasped accurately, making it impossible to always ensure the desired cooling or heating effect.

SUMMARY OF THE INVENTION

It is the object of the present invention to provide an improved air conditioner system and control method therefor in which the temperature control system for determining the amount of heat radiation is designed to perform an over-correction function so that the amount of heat radiation is temporarily increased so as to cause the temperature of the air-conditioned area to exceed the desired value and the increase in the amount of heat radiation is terminated when the sensed value of the air-conditioned area temperature attains or nearly attains the desired value, whereby the temperature of the air-conditioned area is varied to come rapidly up to near the desired level and a satisfactory rapid cooling or heating effect is always ensured.

DESCRIPTION OF THE PREFERRED EMBODIMENT

Figure 1:
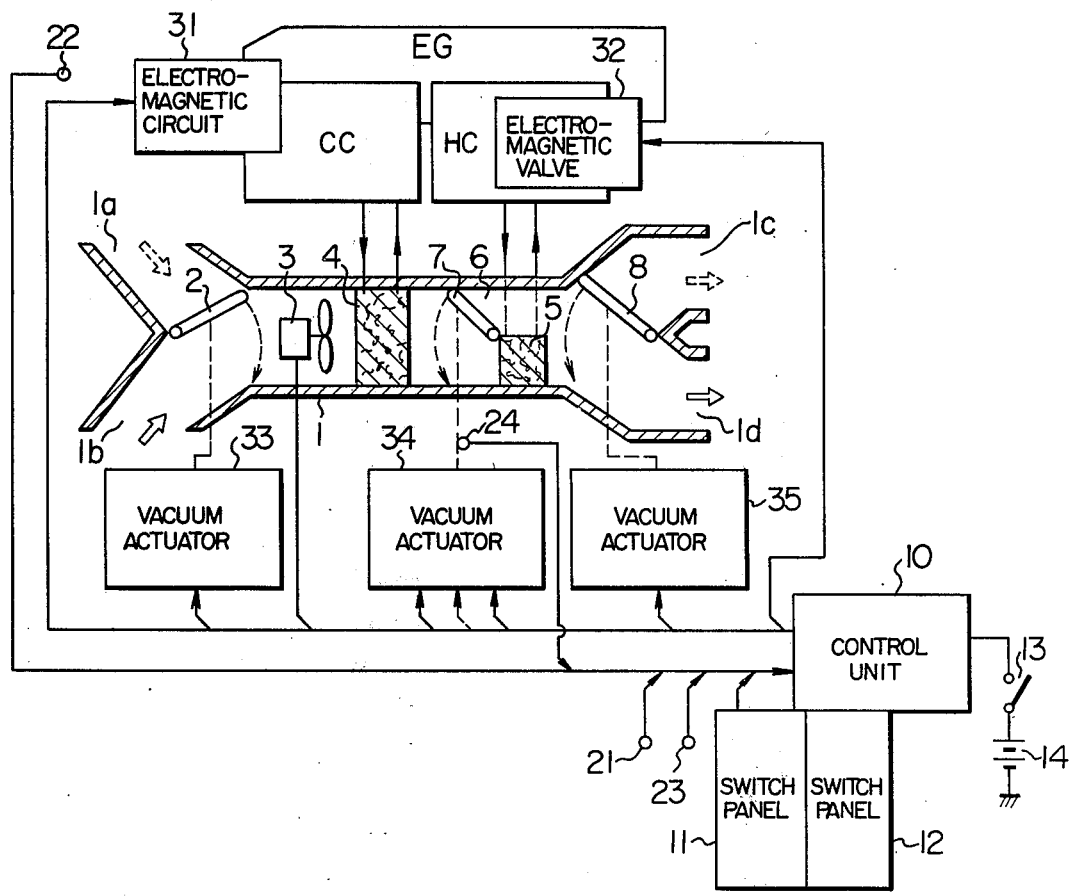
FIG. 1 is a schematic block diagram showing an embodiment of the present invention.

FIG. 1 shows schematically the overall construction of a known automobile air conditioner system of the cold and hot air mixing type incorporating the present invention. In the Figure, arranged upstream of an air duct 1 provided in the front part of the compartment of an automobile are an outside air inlet port 1a for introducing the air and an inside air inlet port 1b for circulating the inside air, and these inlet ports are opened and closed by an inside and outside air damper 2. Arranged inside the air duct 1 downstream are a blower motor 3, an evaporator 4 forming a part of a cooling cycle CC, a heater core 5 forming a part of a cooling water cycle HC of an engine EG and a temperature adjusting damper or A/M damper 7 for adjusting the ratio of the air through the heater core 5 to the air through a bypass passage 6 in this order. Disposed in the lowermost portion of the air duct 1 are upper and lower air outlets 1c and 1d by which the air subjected to temperature adjustment within the duct is blown into the upper and lower parts of the vehicle compartment, and these air outlets are opened and closed by an air outlet damper 8.

A control unit 10 is supplied with various data signals to perform the necessary processing steps in accordance with a predetermined control program and thereby to electrically command the operation of the temperature adjusting function elements designated by the reference numerals 1 to 8 and perform the desired temperature control and various other operation mode controls.

Provided as means for supplying the various data signals to the control unit 10 are an inside air temperature sensor 21 including a temperature sensitive resistor for generating an analog voltage $T_{r'}$ indicative of the vehicle compartment temperature, an outside air temperature sensor 22 including a temperature sensitive resistor for generating an analog voltage signal $T_{am'}$ indicative of the temperature outside the vehicle compartment, a temperature setting means 23 including a variable resistor for generating an analog voltage signal $T_{set'}$ indicative of a present temperature (or a preset position), a position sensor 24 including a potentiometer for generating an analog voltage signal $A_{r'}$ indicative of the position of the temperature adjusting damper 7, and a switch panel 11 for generating on-state and off-state signals in response to the operation of a group of switches for starting, stopping and operation mode selecting purposes.

Provided as means for operating the function elements in response to the electric commands from the control unit 10 include an electromagnetic clutch 31 for switching on an off the drive force applied from the engine EG to the cooling cycle CC, an electromagnetic valve 32 for opening and closing the cooling water circulation path to the heater core 5 in the heating cycle HC, and solenoid valve controlled vacuum actuators 33, 34 and 35 which are responsive to the engine vacuum to apply the forces required for opening and closing the inside and outside air damper 2, the temperature adjusting damper 7 and the air outlet damper 8. A display panel 12 is responsive to the output signals of the control unit 10 to display the operating conditions of the air conditioner system and the control unit 10.

The control unit 10 is also adapted to control the operation of other vehicle systems besides the air conditioner system and it is made operable by the power supplied from a vehicle battery 14 upon closing of a vehicle ignition switch 13.

Figure 2:
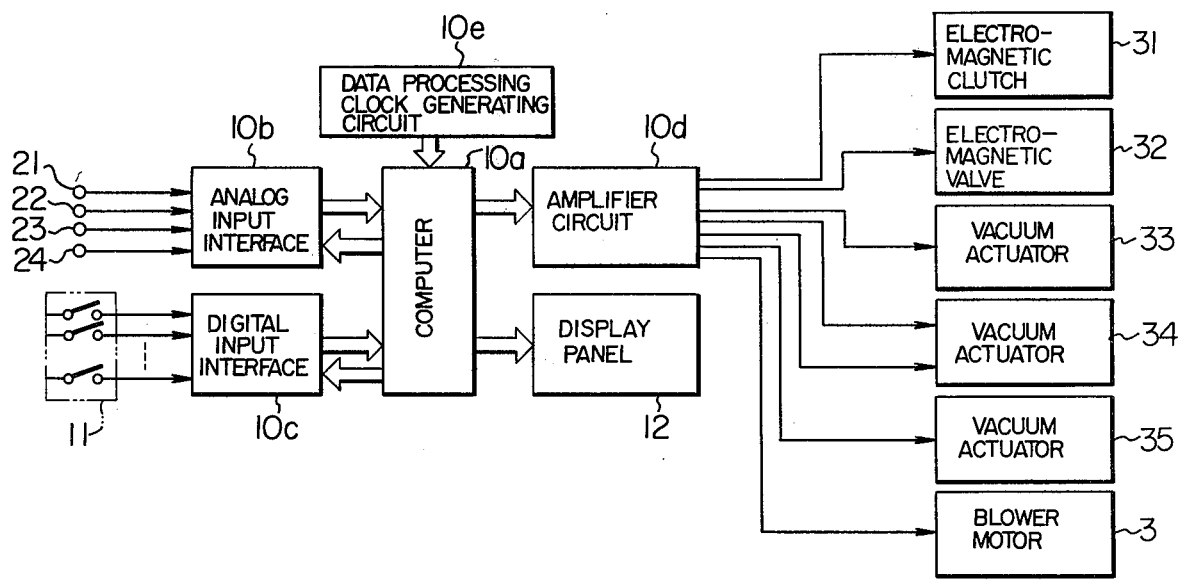
FIG. 2 is a block diagram of the electric system in the embodiment of FIG. 1.

As shown in FIG. 2, the control unit 10 comprises a digital computer or microcomputer 10a for performing the data processing in accordance with a predetermined control program, an analog input interface 10b whereby the analog voltage signals from the signal input means 21, 22, 23 and 24 are selectively subjected to analog-to-digital conversion and applied to the computer 10a, a digital input interface 10c whereby the on-state and off-state signals from the switch panel 11 are reshaped and then applied to the computer 10a, an amplifier circuit 10d for amplifying the command signals generated from the computer 10a for operating the function elements 3 and 31 to 35, a data processing clock generating circuit 10e, a voltage regulating circuit (not shown), and an initializer circuit (not shown) for initiating the operation of the computer 10a just after the closing of the ignition switch 13.

Figure 3:
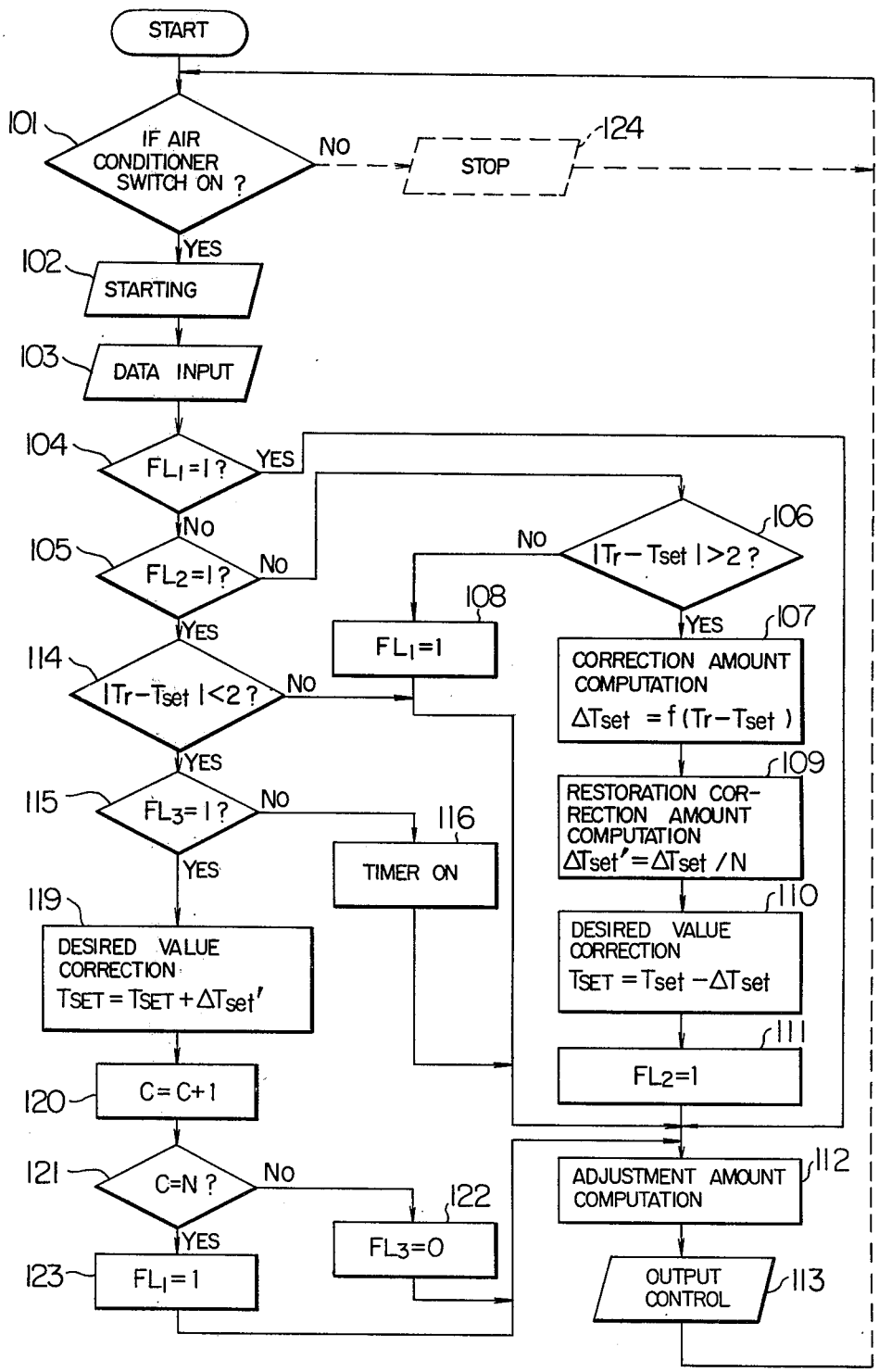
FIG. 3 is a flowchart showing the processing steps of the computer 10 used with the embodiment of FIG. 1 for controlling its operation.

FIG. 3 is a flowchart for the control program of the computer 10a, and the operation of the system will now be described with reference to FIG. 3.

When the ignition switch 13 is closed, the computer 10a is initialized (determination of initial condition) and the control program shown in FIG. 3 is started. Firstly, the operating conditions of the switches in the switch panel 11 are checked repeatedly through the interface 10c. In other words, a check process step 101 checks whether the operating switch for the air conditioner system or the air conditioner switch has been turned on. If it is not or NO, the check process branches away to check by way of a stop step 124 the switches of the other vehicle systems to perform necessary control of the respective systems.

If the air conditioner switch has been turned on or YES, a starting step 102 supplies current to the blower motor 3, the electromagnetic clutch 31 and the electromagnetic valve 32 through the amplifier circuit 10d, thus starting the operation of heat exchange in the heat exchangers 4 and 5. When the start step 102 is performed first after the closing of the air conditioner switch, decision terms or flags $FL_1$, $FL_2$, $FL_3$ and $FL_4$, etc. of th control program which will be described later are set to their initial or zero state. The next data input step 103 sequentially introduces through the interface 10b the analog voltage signals $T_{r'}$, $T_{set'}$, $T_{am'}$ and $A_{r'}$ from the signal input means 21, 22, 23 and 24 as digital signals $T_r$, $T_{set}$, $T_{am}$ and $A_r$.

Figure 4:
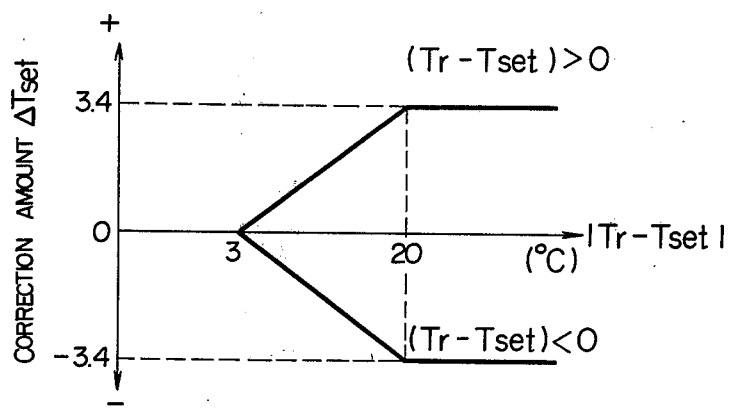
FIG. 4 is a characteristic diagram showing the correction amount computing operation of the embodiment in graphic form.

Since the over-correction termination flag $FL_1$ has been set to zero indicative of the initial state, a decision step 104 causes the processing to branch away to an over-correction start decision step 105. Since the over-correction start flag $FL_2$ is zero indicative of the initial state, the decision step 105 causes the processing to branch away to a correction decision step 106. If the difference between the sensed value $T_r$ of the inside air temperature sensor 21 and the desired value $T_{set}$ of the setting means 23 is over 2° C., the step 106 causes the control to pass to a correction amount computing step 107. If the difference is less than 2° C., the control is transferred to a step 108 so that the over-correction termination flag $FL_1$ is set to one and the execution of the steps including the step 105, et seq. is stopped. The correction amount computing step 107 computes a correction amount $\Delta T_{set}$ from a predetermined function expression selected in accordance with the sensed value $T_r$ and the desired value $T_{set}$. In the present embodiment, the correction amount $\Delta T_{set}$ represents a value which increases or decreases a desired value term $T_{SET}$ which will be used in the computation for determining the desired amount of heat radiation, and the correction amount $\Delta T_{set}$ may for example be represented graphically as shown in FIG. 4. The next restoration correction amount computing step 109 computes one step of decrement amount or restoration correction amount $\Delta T_{set'}$ for gradually or stepwise decreasing the correction amount $\Delta T_{set}$ to zero upon the completion of the over-correction. The restoration correction amount $\Delta T_{set'}$ may for example be a value obtained by dividing the correction amount $\Delta T_{set}$ by N (e.g., 5). The next desired value correction step 110 corrects by the correction amount $\Delta T_{set}$ the desired value term $T_{SET}$ used in the computation of adjustment amount which will be described later, and the over-correction start flag $FL_2$ is set to one by the next step 111.

Figure 5:
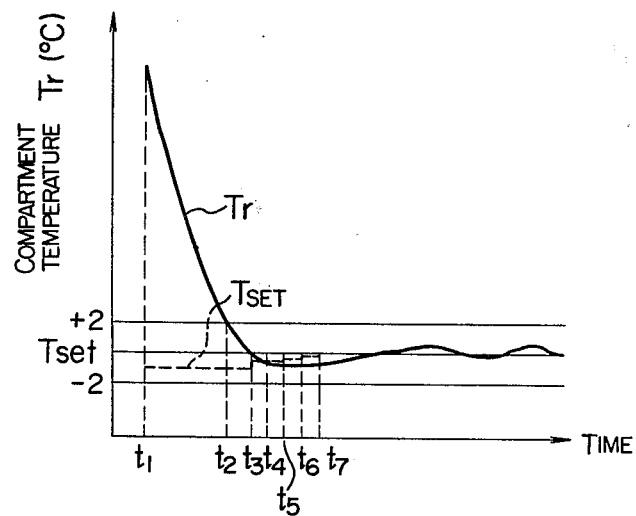
FIG. 5 is a time chart useful for explaining the operation of the embodiment.

The next adjustment amount computing step 112 computes the desired amount of heat radiation from a predetermined computational expression in accordance with the detected inside air temperature $T_r$, the detected outside air temperature $T_{am}$ and the preset or corrected desired value $T_{SET}$. This computation is given by the following expression and the resulting term $T_{ao}$ represents the opening or position of the air mixing damper 7 when the amount of air supply by the blower motor 3 is constant $$T_{ao}=K_{set}\cdot T_{SET}-K_r T_r-K_{am}\cdot T_{am}+C \tag{1}$$

where $K_{set}$, $K_r$, $K_{am}$ and C are constants. The next output control step 113 compares the detected value $A_r$ of the damper opening with the computed value $T_{ao}$ and applies a control command signal to the vacuum actuator 34 through the amplifier circuit 10d. The desired value $T_{SET}$ which was corrected by the step 110 is maintained at the same value until the decision step 114 determines that the difference between the sensed value $T_r$ and the preset desired value $T_{set}$ is less than 2° C. As a result, if the air conditioning is started at a time $t_1$ and the sensed value $T_r$ is considerably higher than the desired value $T_{set}$ as shown in FIG. 5, the position of the air mixing damper 7 is adjusted so as to decrease the vehicle compartment temperature ($T_r$) down to the desire value $T_{SET}$ which is smaller than the actual desired value ($T_{set}$) by $\Delta T_{set}$. Consequently, the sensed value $T_r$ is rapidly decreased with a temperature gradient corresponding to the maximum cooling capacity obtained when the damper 7 is in the maximum cooling position. Although the temperature gradient decreases as the sensed temperature $T_r$ approaches the desired value $T_{SET}$, the vehicle compartment temperature is caused to decrease with a sufficiently large gradient until it comes near to the actual desired value $T_{set}$.

A judging or decision step 114 judges whether the sensed value $T_r$ has come within ±2° C. of the desired value. If it is, the control is transferred to a step 115 and the process is started to stepwise diminish the correction amount $\Delta T_{set}$ to zero. Firstly, the control is transferred from the timer operation judging step 115 to a timer operation step 116 so as to start a timer process which constitutes the basis of a judgement as to whether a unit time (30 seconds in this embodiment) for adding one step of a restoration correction amount $\Delta T_{set'}$ has elapsed or not. This timer process is such that the computer 10a performs an internal interruption process at a predetermined period and the time decision flag $FL_3$ is set to one when the occurrences of internal interruption process reach a number corresponding to a predetermined time interval. For example, the Fujitsu one-chip 4-bit microcomputer MB8841 has a function of performing this timer process. When this occurs, the time decision step 116 determines whether the unit time has elapsed. The course is represented by the time interval from $t_2$ to $t_3$ in FIG. 5, in which the time $t_2$ represents the time of the sensed value $T_r$ decreasing to a temperature equal to the desired value $T_{set}$ plus 2° C. and the time $t_3$ represents the time after the lapse of 30 seconds. The decision region of the step 114 for the sensed value $T_r$ may be suitably changed in accordance with the system response characteristic and it is only necessary that the decision region is equal to or near the desired value $T_{set}$.

At the time $t_3$, the control program causes a jump to a desired value correction step 119 so that the desired value $T_{SET}$ is increased by the restoration correction amount $\Delta T_{set'}$ or by one step to bring it nearer to the actual desired value $T_{set}$. This restoration correction is executed repeatedly in such a manner that the restoration correction is effected step by step at intervals of the unit time through a counting step 120 and a decision step 121 until the number of times of the timer operation flag $FL_3$ reaches N. In this way, the computed desired value $T_{SET}$ to be controlled comes nearer to the actual desired value $T_{set}$ step by step as the time passes through $t_3$, $t_4$, $t_5$, $t_6$ and $t_7$, respectively, and they become substantially equal to each other at the time $t_7$. In the time interval, the adjustment amount computing step 112 is performed repeatedly so that the sensed value $T_r$ approaches the desired value $T_{set}$ with some overshoot due to a delay in the propagation of heat. In the present embodiment, the required time interval from $t_2$ to $T_7$ is 150 seconds. This is for the purpose of further increasing the delay of the ordinary control system in responding to variations of the sensed value $t_r$ due to the movement of the air mixing damper 7 and thereby slowly adjusting the vehicle compartment temperature to the desired value $T_{set}$. The response delay of the control system may be set as desired or its time gradient may be set as desired in case of need. When the computed desired value $T_{SET}$ becomes equal to the actual desired value $T_{set}$, the correction completion flag $FL_1$ is set to one and the over-correction steps including the step 105, et seq. are stopped.

After the output control step 113, although not shown, steps for controlling the air conditioner system, such as, a change-over step for the inside and outside air damper 2, a change-over step for the air outlet damper 8 and a display step for displaying the sensed value $T_r$ by the display panel 12 are performed and the control of other vehicle systems are performed in case of need. Then, the control is returned to the step 101 and the air conditioning control is performed repeatedly. When the air conditioner switch is turned off, the stop step 124 interrupts the current flow to the blower motor 3, the electromagnetic clutch 31 and the electromagnetic valve 32 and the temperature control is stopped.

The temperature control for cooling purposes (i.e., the control for blowing cold air or supplying negative heat into the vehicle compartment to prevent the vehicle compartment temperature from exceeding a desired value) has been described so far, and the control of temperature for heating purposes is carried out in the similar manner so that the vehicle temperature ($T_r$) is caused to overshoot toward a computed desired value which is higher than the desired value $T_{set}$.

The invention is not intended to be limited to the specific embodiment shown and described herein, and many changes and modifications may be made to it as follows.

(1) In addition to the closing of the air conditioner switch, the time of changing the desired value $T_{set}$ (or the time of starting the air conditioning control again) may be used as the timing of the over-correction control represented by the steps 105 to 111 and the steps 114 to 123 or alternatively the over-correction control may be performed when the closing of the air conditioning control or the changing of the desired value $T_{set}$ takes place in addition to the closing of a separate over-correction switch.

(2) The closing of the air conditioner switch may be associated with a control for decreasing the rotational speed of the blower motor 3 for some time after which the over-correction control of the present invention is performed.

(3) The over-correction control may of course be carried out in such a manner that the constant term C in the previously mentioned expression (1) may be subjected to over-correction in addition to the over-correction of the computed desired value $T_{SET}$ with respect to the desired value $T_{set}$, thus varying the vehicle compartment temperature to substantially exceed the desired value $T_{set}$.

(4) The over-correction amount such as $\Delta T_{set}$ may be determined in dependence on the sensed value ($T_r$) or the desired value ($T_{set}$). Alternatively it may be predetermined to assume a fixed volume.

(5) While the opening of the air mixing damper 7 will constitute a principal heat amount controlling factor if the rotational speed of the blower motor 3 is fixed in the control of the heat radiation amount, the control of heat amount may be performed in combination with the adjustment of the amount of heat radiation due to variation of the rotational speed of the blower motor 3. Alternatively, the capacity of the heat exchangers (4, 5) may be adjusted.

(6) A term representing the heat exchanging capacity of the heat exchangers as well as a term representing the amount of incident sun light to the air-conditioned area may for example be added to the expression (1) so as to effect the temperature control with a greater accuracy.

(7) The invention may be incorporated in air conditioner systems of the type used solely for cooling purposes or heating purposes.

(8) The control unit may be comprised of analog control circuitry in place of the digital computer or the control unit may be comprised of analog control circuitry and digital control circuitry.

It will thus be seen from the foregoing description that the present invention has a great advantage that over-correction is temporarily applied to the temperature control system so as to rapidly vary the temperature of the air-conditioned area to come nearer to a desired value and that the over-correction is stopped when the temperature reaches or nearly reaches the desired value, thus automatically providing the proper rapid cooling or heating effect.

What is claimed is:

1. In an air conditioner system for an automotive vehicle having means for adjusting the amount of heat radiated into a compartment of an automotive vehicle, means for sensing an actual temperature of said vehicle compartment, means for establishing a desired temperature of said vehicle compartment, and control means for determining an amount of adjustment of said adjusting means in accordance with controlling conditions including said actual temperature sensed by said temperature sensing means and said desired temperature established by said establishing means, the improvement wherein said control means includes:

means for temporarily increasing said amount of adjustment to vary the temperature of said vehicle compartment to exceed said desired temperature; and means for terminating said increase in said amount of adjustment after said sensed actual temperature has reached or nearly reached said desired temperature.

2. In an air conditioner system of an automative vehicle having means for establishing a desired temperature of vehicle compartment, means for sensing an actual temperature of said vehicle compartment, means for cooling air supplied to said vehicle compartment, means for heating a portion of cooled air supplied from said cooling means to said vehicle compartment, and means for controlling the amount of said portion of cooled air supplied from said cooling means to said heating means so that said sensed actual temperature approaches said established desired temperature, an improved method comprising:
deriving a difference between said established desired temperature and said sensed actual temperature when said desired temperature is established;
comparing said derived difference with a predetermined reference value;
deriving a correction value in accordance with said difference when the result of said comparing step indicates that said derived difference exceeds said predetermined reference value;
establishing a desired amount of said portion of cooled air in accordance with both of said established desired temperature and said derived correction value;
adjusting repeatedly, until the result of said comparing step indicates that said derived difference is reduced below said reference value, said amount controlling means so that said established desired amount of said portion of cooled air is supplied to said heating means;
correcting said established desired amount of said portion of cooled air gradually toward a final value corresponding to said established desired temperature; and
adjusting repeatedly said amount controlling means so that said corrected desired amount of said portion of cooled air is supplied to said heating means.

3. In an air conditioner system of an automotive vehicle having means for establishing a desired temperature of vehicle compartment, means for sensing an actual temperature of said vehicle compartment, means for cooling air supplied to said vehicle compartment, and means for controlling the amount of cooled air so that said sensed actual temperature approaches said established desired temperature, an improved method comprising:
deriving a difference between said desired temperature and said actual temperature;
comparing said derived difference with a predetermined reference value;
deriving a correction value in accordance with said difference when the result of said comparing step indicates that said derived difference exceeds said predetermined reference value;
establishing a desired amount of cooled air in accordance with both of said desired temperature and said derived correction value;
adjusting repeatedly, until the result of said comparing step indicates that said derived difference is reduced below said reference value, said amount controlling means so that said established desired amount of cooled air is supplied to said compartment;
correcting said established desired amount of cooled air gradually toward a final value corresponding to said established desired temperature; and
adjusting repeatedly said amount controlling means so that said corrected desired amount of cooled air is supplied to said compartment.

4. In an air conditioner system of an automotive vehicle having means for establishing a desired temperature of vehicle compartment, means for sensing an actual temperature of said vehicle compartment, means for heating air supplied to said vehicle compartment, and means for controlling the amount of heated air so that said sensed actual temperature approaches said established desired temperature, an improved method comprising:
deriving a difference between said desired temperature and said actual temperature;
comprising said derived difference with a predetermined reference value;
deriving a correction value in accordance with said difference when the result of said comparing step indicates that said derived difference exceeds said predetermined reference value;
establishing a desired amount of heated air in accordance with both of said desired temperature and said derived correction value;
adjusting repeatedly, until the result of said comparing step indicates that said derived difference is reduced below said reference value, said amount controlling means so that said established desired amount of heated air is supplied to said compartment;
correcting said established desired amount of heated air gradually toward a final value corresponding to said established desired temperature; and
adjusting repeatedly said amount controlling means so that said corrected desired amount of heated air is supplied to said compartment.

5. In an air conditioner system of an automotive vehicle having means for establishing a desired temperature of vehicle compartment, means for sensing an actual temperature of said vehicle compartment, means for cooling air supplied to said vehicle compartment, means for heating air supplied to said vehicle compartment, and means for controlling the amount of each air so that said sensed actual temperature approaches said established desired temperature, an improved method comprising:
deriving a difference between said desired temperature and said sensed actual temperature;
comparing said derived difference with a predetermined reference value;
deriving a correction value in accordance with said difference when the result of said comparing step indicates that said derived difference exceeds said predetermined reference value;

establishing a desired amount of said each air in accordance with both of said desired temperature and said correction value;

adjusting repeatedly, until the result of said comparing step indicates that said derived difference is reduced below said reference value, said amount controlling means so that said established desired amount of said each air is supplied to said compartment;

correcting said established desired amount of said each air gradually toward a final value corresponding to said established desired temperature; and adjusting repeatedly said amount controlling means so that said corrected desired amount of said each air is supplied to said compartment.

* * * * *